Feb. 10, 1959 W. C. RUDD 2,873,353
WELDING OF HELICALLY FORMED TUBING
Filed Nov. 30, 1955 2 Sheets-Sheet 1
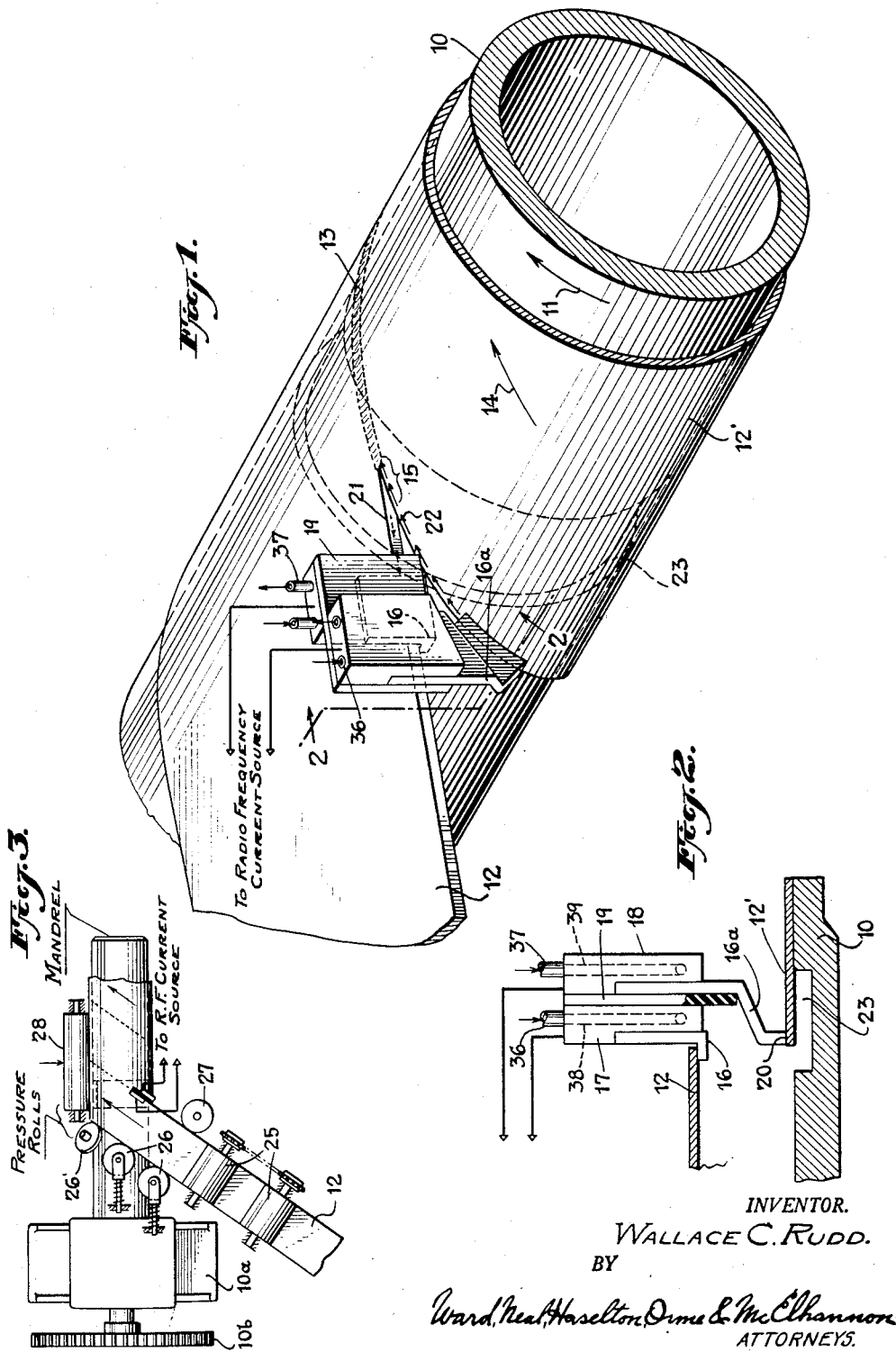
INVENTOR.
WALLACE C. RUDD.
BY
Ward, Neal, Haselton, Orme & McElhannon
ATTORNEYS.

Feb. 10, 1959 W. C. RUDD 2,873,353
WELDING OF HELICALLY FORMED TUBING
Filed Nov. 30, 1955 2 Sheets-Sheet 2
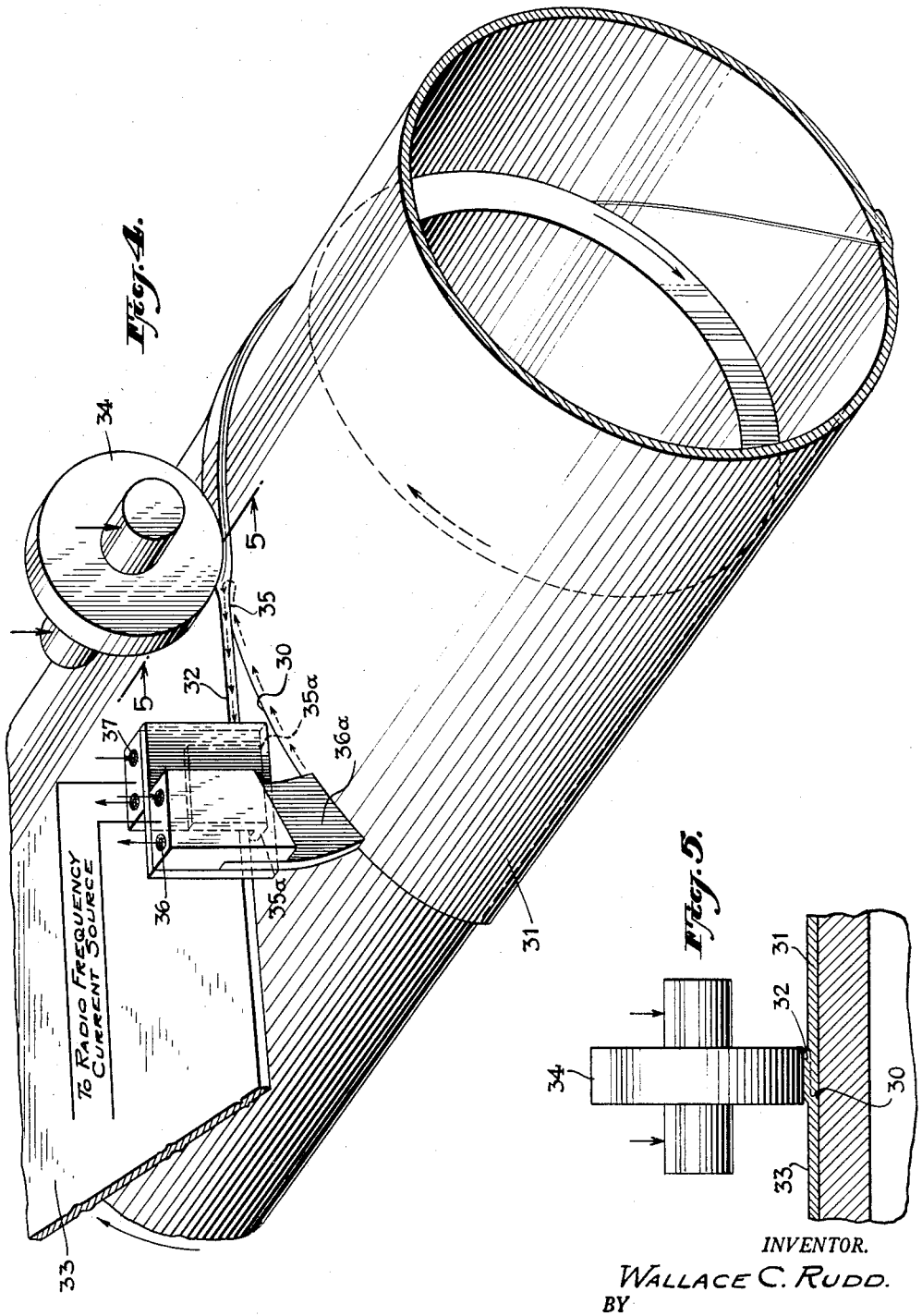
INVENTOR.
WALLACE C. RUDD.
BY
Ward, Neal, Haselton, Orme & McElhannon
ATTORNEYS.

United States Patent Office 2,873,353
Patented Feb. 10, 1959

2,873,353

WELDING OF HELICALLY FORMED TUBING

Wallace C. Rudd, Larchmont, N. Y., assignor to Magnetic Heating Corp., New Rochelle, N. Y., a corporation of New York Application November 30, 1955, Serial No. 549,986

6 Claims. (Cl. 219—62)

This invention relates to methods and apparatus for welding metal tubing of the type formed by helically winding a metal ribbon while welding together adjacent edges of the ribbon along a helical line. More particularly, the invention relates to a method and means for forming such weld by electrical resistance heating of the edges to be welded by the use of high frequency current.

Reference is made to the copending application of Wallace C. Rudd and Robert J. Stanton, Serial No. 421,768, filed April 8, 1954, and to their preceding application Serial No. 332,422, filed January 21, 1953 (now abandoned), the subject matter of said applications being disclosed also in Belgian Patent No. 530,877, granted August 31, 1954. Said applications and said patent disclosed a method and means for welding together the edges defining the longitudinal gap in metal tubing as the tubing is advanced longitudinally while applying pressure thereto to close said gap at a weld point. According to said method, the heating of the gap edges is effected by the use of electrodes connected to an oscillatory current source and applied respectively adjacent the gap edges at points positioned shortly in advance of the welding point, the current being of a frequency sufficiently high so that the lowest impedance path between the electrodes follows said gap edges to and from the weld point. The present invention involves a novel apparatus arrangement and a modification of the method of said prior applications, such as to provide for the welding of the above-mentioned helically formed type of tubing.

Various further and more specific objects, features and advantages of the invention will appear from the description given below taken in connection with the accompanying drawings illustrating by way of example certain preferred forms of the invention.

In the drawings:

Fig. 1 is a perspective view illustrating one embodiment of the method of the invention and the arrangement of the principal apparatus parts for performing such method;

Fig. 2 is a sectional view taken substantially along line 2—2 of Fig. 1;

Fig. 3 is a somewhat schematic diagram of one form of apparatus for carrying out the invention;

Fig. 4 is a view similar to Fig. 1 but illustrating an alternative method and arrangement; and Fig. 5 is a sectional view taken substantially along line 5—5 of Fig. 4.

Referring to Fig. 1 in further detail, a mandrel is provided as at 10 which may be rotatably supported by suitable bearing means indicated at 10a (Fig. 3) and arranged to be rotated about its axis at a constant speed in the direction indicated by the arrow 11 by a suitable sprocket or gear 10b connected to a suitable source of power. Meanwhile a ribbon of metal 12 is wound onto the mandrel to form a tube thereon made up of a succession of convolutions as at 12′ of the metal ribbon, the edges of which convolutions are brought into abutment and are welded along a helical path, as indicated at 13. As the mandrel with the formed tube thereon rotates, the tubing as formed is also advanced (in the general direction indicated by the arrow 14) and by the use of suitable known types of apparatus which per se form no part of the present invention.

The welding of the abutting gap edges takes place at a so-called "weld point" preferably at the region indicated at 15 in Fig. 1. At points on or adjacent the approaching edges of the metal strip which are to abut and at some distance in advance of the weld region, high frequency electrical current is applied to the edges respectively by contacts or electrodes 16, 16a which slidably engage the metal of the strip at or adjacent its said edges. That is, as best shown in Fig. 2, the electrodes, such as 16, 16a, may be mounted on and suitably secured to metal holders as at 17, 18 which are insulated with respect to each other as by a suitable insulation piece 19 located therebetween. While said electrodes may be shaped and positioned to engage either the edge surfaces per se of the metal strip or either the upper or the under surface thereof near such edges, yet as shown in Fig. 2 the electrode 16 is preferably so shaped and positioned at to engage the under surface near and at the edge of strip 12 whereas the electrode 16a is shaped to engage at and near the outer or upper surface of the convolution 12′, that is, at a point indicated at 20. The electrode holders as shown are connected respectively to the two terminals of a source of oscillatory current of high frequency, preferably radio frequency in the range of 100 to 500 kilocycles per second. With current of such frequencies, the path of lowest possible impedance connecting the electrodes 16 and 16a will be along the approaching gap edges 21, 22 as indicated by small arrows in Fig. 1, that is, from the electrodes to and from the weld region 15. This is for the reason that the conditions are such that with currents of these frequencies the predominant impedance factor will comprise inductance and the path of lowest inductance will be along the closely adjacent and approaching gap edges and thus the heating effect of such current will be closely confined to such edges. Sufficient current is used thereby to cause resistance heating of such edges up to welding temperature. That is, from the points where the edges come into contact with the electrodes, any given point on said edges will be heated more and more until same reaches the maximum temperature just at the beginning of the welding region where a noticeable arc will occur.

As above noted, the electrode 16 is preferably applied to the underside of the edge of strip 12 and electrode 16a is applied to the upper or outer surface of convolution 12′. This insures that the current will tend to concentrate most along the lines which are close together on the edge regions approaching the weld and thus the current will be along lines providing for the minimum reactance by reason of such closeness.

It should also be noted that the points on the bottom corner of edge 21 will normally be the first to come in contact with edge 22 and will do so by contacting points on the top corner of edge 22. Thus with the electrodes in the preferred positions above described, the points which tend to be hottest will contact first, creating a small arc which will insure adequate heating of the remaining edge surfaces sufficiently so that the surface on edge 21 will wipe against the surface on edge 22 as the edges come into the final desired abutting relationship.

The contact holders 17, 18 may be supported by any suitable insulation bracket means not shown and the distance between the electrodes and the weld may be determined and adjusted by trial so that with a predetermined set of conditions and with a given amount of current, the approaching gap edges will have time to be heated up to welding temperature and not substantially higher at the moment when they first come together.

The mandrel 10, as best shown in Fig. 2, may be formed on its surface with an annular recessed portion or groove 23 at the region where welding occurs so that the edge of convolution 12' will be spaced apart from the metal of the mandrel thereby preventing the dissipation of heat from the edge 22 into the mandrel and preventing any tendency for a portion of the current to travel along the surface of the mandrel rather than as desired along the edge 22 of the convolution 12'. Nevertheless, under certain circumstances it may be found that more heat will be required to heat the edge 22 (hereinafter referred to as the "trailing edge" of its convolution) up to welding temperature than in the case of edge 21 (hereinafter referred to as the "forward edge" of ribbon 12) which is spaced widely out of contact with the mandrel. On the other hand, under some circumstances the formed portion of the tubing may have become sufficiently heated so that less heating will be required for edge 22 than for edge 21. For instance, this might be so in the case of quite thin tubing welded with closely spaced convolutions.. Thus to accommodate these conditions, the contact or electrode supports should be positioned and adjusted by trial independently at suitable distances from the weld point. That is to say, for example, if edge 21 requires less heating, then electrode 16 would be placed closer to the weld or in case more heating of this edge is required, this electrode would be spaced further from the weld. The same is true as to the proper positioning of electrode 16a along edge 22.

As somewhat schematically indicated in Fig. 3, the strip 12 may be advanced toward the mandrel by suitable pairs of pinch rollers at 25. The strip should be yieldably urged sideways to bring the edges 21, 22 into firm contact for welding and this may be accomplished as by spring pressed rollers somewhat schematically indicated at 26, 26' and an opposed guide roll being indicated at 27. At a suitable position following welding of the edges together, the strip may be pressed against the mandrel as by a pressure roller 28.

With the method and arrangement shown in Figs. 4 and 5, the same mandrel supporting and rotating means therefor may be used as well as the same means for feeding the strip as shown in Figs. 1 and 3 except that in Fig. 4, however, the strip is suitably fed in a position so that the trailing edge 30 of formed convolution 31 will be overlapped by the edge 32 of strip 33 so that such edges will be overlapped and welded together with a cross-sectional formation as indicated in Fig. 5. Also with the arrangement as shown in Figs. 4 and 5, preferably just following the weld point, the overlapped edges are pressed firmly against the mandrel as by a pressure applying roller 34. Furthermore, with this arrangement the annular gap in the mandrel is preferably omitted so that the weld will be firmly supported by the mandrel in the region of the pressure roller 34.

The contacts or electrodes 35a, 36a for applying the current with the arrangement of Fig. 4 may be preferably adjustably supported the same way as those of Fig. 1. With the arrangement of Fig. 4, since the edge 30 will be in contact with the mandrel to which some heat may be dissipated as well as some of the heating current, it will generally be necessary to provide a longer heating path for its edge 30 than for its edge 32 and consequently electrode 36a should generally be adjusted at an appropriate distance from the weld point which will be greater than the distance of electrode 35a from the weld point.

The method and arrangement of Fig. 4 may often be preferred to that of Fig. 1 inasmuch as the approaching edges will come together at a given point, viz., the point indicated at 35, and remain together at such point without relative movement thereby providing a more closely defined weld point or, strictly speaking, a more closely defined weld line or small area. Furthermore, with the overlapping edges, as in Fig. 4, the problem of pressing and holding the welded surfaces together is simplified as compared with the method of pressing edges into abutting relation. Also with the arrangement of Fig. 4, it will be apparent that on both the "trailing edge" 30 as well as on the "forward edge" 32 "bands" on the opposed surfaces will be heated, that is, at the edge 30 the high frequency current will travel along and be concentrated along a band upon the upper (that is to say the outer) surface which faces and comes closest to the edge 32, and at the edge 32 the high frequency current will be concentrated upon and cause heating of a band on the under or inner surface at that edge. The concentration of the heating on these bands, of course, arises because of the effects of mutual inductance between the current flows on opposite sides of the gap. And it will be apparent that the width of these bands where the heating is concentrated will be determined by the extent to which the edge portions overlap, even though the degree of overlap may vary. Thus the heating to welding temperature will be concentrated upon just the particular surface portions which are to come into engagement and be welded together regardless of the full surface width of the strips. Because of such concentration of the heating to welding temperature along on the very surfaces of such bands, the metal inwardly of such surfaces will receive substantially less heat and remain relatively rigid permitting a good forged weld under pressure between the surface bands which are heated to welding temperature.

With the embodiments of all of the figures it will ordinarily be necessary to provide for fluid cooling of the electrode supports. This may be readily accomplished by providing conduits, as at 36, 37, for cooling fluids such as, for example, water as is best shown in Fig. 2, these conduits being connected respectively to suitable circulating cavities as at 38, 39 formed in the electrode supports. These cooling fluid connections are further indicated as will be apparent in Figs. 1 and 4.

The use of the above-described sliding contacts in combination with the use of high frequency current is particularly desirable as compared with the use of low frequency current with roller contacts as sometimes heretofore proposed for some welding operations. This is true because with such sliding contacts and high frequency current an extended contact area may be achieved and it is unnecessary that the contacts be applied under any considerable pressure since the high frequency current will flow into the metal edges with such contacts without the danger of any arcing at the contacts and consequent difficulties and the flow will be closely defined to the edges where needed. Furthermore, since roller contacts would touch the edges only tangentially with substantially only a line contact, such rollers, particularly with low frequency currents, are not capable of conducting such current into the edges effectively and without prohibitive arcing unless subjected to great pressure which would tend to distort or crush the metal strip and such roller contacts if large enough to be effective with their pressure applying means would be difficult to mount and support within the limited space available at the approaching gap edges in the making of helically wound tubing. And furthermore, low frequency current will tend to distribute itself widely away from the gap edges and thus be largely wasted.

With above of the above-described modifications, if desired, the annular gap in the mandrel, such as indicated at 23 by dotted lines, may be filled by any suitably known good heat resistant material thereby forming a firm support for the edges being welded at the weld point and avoiding the conduction of current into the metal of the mandrel. In some cases, particularly where a thin wall tubing is being formed, the mandrel may be formed entirely of insulating means or covered with a tubing of insulation.

Although certain particular embodiments of the invention are herein disclosed for purposes of explanation, various further modifications thereof, after study of this specification, will be apparent to those skilled in the art

What is claimed and desired to be secured by Letters Patent is:

1. In a method for forming metal tubing by helically winding a metal ribbon to form successive convolutions joined together at their edges by a helical butt-welded seam, the combination of steps which comprises: advancing the ribbon generally tangentially and flatwise onto a mandrel with the edges of the ribbon positioned at an angle to the axis of the mandrel corresponding to the pitch of the desired helically welded seam; forming the ribbon into a succession of convolutions with abutting edges and embracing the mandrel while advancing said convolutions longitudinally along on the mandrel; welding at a substantially fixed weld point the trailing edge of each convolution to the forward edge of the ribbon substantially as the ribbon starts to form into a convolution about the mandrel, by applying contacts respectively to the edges which are to be welded together shortly in advance of said weld point, said contacts respectively being connected to the terminals of a source of current of the frequency of 100,000 cycles per second or higher, whereby said current flows from said contacts along said edges to and from substantially the weld point, the resulting resistance heating of such edges being substantially concentrated along such edges and acting to increase the temperature thereof until same come into contact adjacent the weld point and whereby said forward edge of the ribbon then wipes across said trailing edge into its final butt-welded position in respect thereto; and applying pressure to said ribbon in a direction longitudinally of the mandrel means for forcing the forward edge thereof under pressure against said trailing edge at the weld point.

2. In a method for forming metal tubing by helically winding a metal ribbon to form successive convolutions joined together at their edges by a helically welded seam, the combination of steps which comprises: advancing the ribbon generally tangentially and flatwise onto a mandrel with the edges of the ribbon positioned at an angle to the axis of the mandrel corresponding to the pitch of the desired helically welded seam; forming the ribbon into a succession of convolutions embracing the mandrel while advancing said convolutions longitudinally along on the mandrel; welding at a substantially fixed weld point the trailing edge of each convolution to the forward edge of the succeeding convolution by applying contacts respectively to the edges which are to be welded together, shortly in advance of said weld point, said contacts respectively being connected to the terminals of a source of current of a frequency of the order of 100,000 cycles per second or higher, whereby said current flows from said contacts along said edges to and from substantially the weld point, the resulting resistance heating of said edges being substantially concentrated along such edges and acting to continue to increase the temperature thereof until same come into contact; applying pressure to the convolutions longitudinally of the mandrel means for forcing said edges into welded engagement at the weld point; and maintaining the contact which engages said trailing edge at a distance from the weld point sufficiently different from the distance of the other contact from the weld point, whereby opposed points of welding on the two edges when they reach the weld point will be heated approximately to the same welding temperature notwithstanding differences in the rate of heating of said edges in travelling from the contacts to the weld point.

3. In a method for forming metal tubing by helically winding a metal ribbon to form successive convolutions joined together at their edges by a helical butt welded seam, the combination of steps which comprises: advancing the ribbon generally flatwise and tangentially of a convolution of the desired tubing with the edges of the ribbon positioned at an angle to the axis of the tubing being formed, such angle corresponding to the pitch of the desired helically welded seam; forming the ribbon into a succession of convolutions with abutting edges while advancing such convolutions longitudinally of said axis; welding at a substantially fixed weld point the trailing edge of each convolution to the forward edge of the ribbon substantially as the ribbon starts to form into a convolution, by applying contacts respectively to the edges which are to be welded together shortly in advance of said weld point, said contacts respectively being connected to the terminals of a source of current of a frequency of the order of 100,000 cycles per second or higher, whereby said current flows from said contacts along on said edges to and from substantially the weld point, the resulting resistance heating of such edges being substantially concentrated along on the edge surfaces and acting to increase the temperature thereof until same come into contact adjacent the weld point and whereby said forward edge of the ribbon then wipes across said trailing edge into its final butt-welded position with respect thereto; and applying pressure to said ribbon in a direction longitudinally of said axis for forcing said forward edge under pressure against said trailing edge at the weld point.

4. In a method for forming metal tubing by helically winding a metal ribbon to form successive convolutions joined together at their edges by a helically welded seam, the combination of steps which comprises: advancing the ribbon generally flatwise and tangentially of a convolution of the desired tubing with the edges of the ribbon positioned at an angle to the axis of the tubing being formed, such angle corresponding to the pitch of the desired helically welded seam; forming the ribbon into a succession of convolutions while advancing said convolutions longitudinally of said axis; welding at a substantially fixed weld point the trailing edge of each convolution to the forward edge of the succeeding convolution by applying contacts respectively to the edges which are to be welded together shortly in advance of said weld point, said contacts respectively being connected to the terminals of a source of current of a frequency of the order of 100,000 cycles per second or higher, whereby said current flows from said contacts along on said edges to and from substantially the weld point, the resulting resistance heating being substantially concentrated on facing portions along on said edges and acting to continue to increase the temperature thereof until same come into contact; applying pressure for forcing such heated edge portions into welding engagement at the weld point; and maintaining the contact which engages said trailing edge at a distance from the weld point sufficiently different from the distance of the other contact from the weld point, whereby opposed points of welding on the two edges when they reach the weld point will be heated approximately to the same welding temperature notwithstanding differences in the rate of heating of said edges in travelling from the contacts to the weld point.

5. In a method for forming metal tubing by helically winding a metal ribbon to form successive convolutions joined together at their edges by a helically welded overlapping seam, the combination of steps which comprises: advancing the ribbon generally flatwise and tangentially of a convolution of the desired tubing with the edges of the ribbon positioned at an angle to the axis of the tubing being formed, such angle corresponding to the pitch of the desired helically welded seam; forming the ribbon into a succession of convolutions with a band portion on the forward edge of said ribbon facing and overlapping a band portion on the trailing edge of the adjacent convolution and while advancing the convolutions longitudinally of the axis, welding said band portions together at substantially a fixed location by applying contacts respectively to or adjacent said band portions shortly in advance of said location, said contacts respectively being connected to the terminals of a source of current of a frequency of the order of 100,000 cycles per second or higher, whereby said current flows from said contacts to and from the location of the weld point and is concentrated because of its said frequency on the band surfaces, the width of the bands heated being determined by the extent of the overlap thereof, the resulting resistance heating of said band surfaces acting to continue to increase the temperature thereof until same come into contact at welding temperature substantially at said location; and applying pressure to the overlapping portions after same come into contact, to press same into welded engagement.

6. In a method for forming metal tubing by helically winding a metal ribbon to form successive convolutions joined together at their edges by a helically welded seam, the steps for butt welding uniformly and continuously the trailing edge of the convolutions to the opposed edge of succeeding convolutions which comprises: forcing such edges together under pressure substantially at a fixed weld point, the edges being spaced apart in advance of such point; applying current of a frequency of the order of 100,000 cycles per second or higher to flow from points at said edges respectively to and from the weld point, the resulting resistance heating of such edges being substantially concentrated along on such edges and acting to continue to increase the temperature thereof until same come into contact at welding temperature, the convolutions as successively welded to form tubing being advanced longitudinally of the axis of the tubing and the high frequency current flows on such edges being in a direction at a substantial angle transversely of such advance.

References Cited in the file of this patent

UNITED STATES PATENTS

| | | |
|---|---|---|
| 446,974 | Lenip et al. | Feb. 24, 1891 |
| 977,711 | Craven | Dec. 6, 1910 |
| 1,278,234 | Sessions | Sept. 10, 1918 |
| 1,679,702 | Wysong | Aug. 7, 1928 |
| 1,865,845 | Dyer | July 5, 1932 |
| 2,066,668 | Bennett | Jan. 5, 1937 |
| 2,139,211 | Sessions | Dec. 6, 1938 |
| 2,663,784 | Iversen | Dec. 22, 1953 |
| 2,794,108 | Park | May 28, 1957 |

FOREIGN PATENTS

| | | |
|---|---|---|
| 1,095,095 | France | Dec. 15, 1954 |